(12) United States Patent
Dodge et al.

(10) Patent No.: US 7,492,476 B1
(45) Date of Patent: Feb. 17, 2009

(54) IMAGE PROCESSING APPARATUS

(75) Inventors: Alexandre Percival Dodge, Berks (GB);
Allan Joseph Davison, Berks (GB);
Adam Michael Baumberg, Berks (GB);
Alexander Ralph Lyons, Berks (GB);
Richard Ian Taylor, Berks (GB)

(73) Assignee: Canon Kabushiki Kaisha, Tokyo (JP)

( * ) Notice: Subject to any disclaimer, the term of this patent is extended or adjusted under 35 U.S.C. 154(b) by 1167 days.

(21) Appl. No.: 10/129,655

(22) PCT Filed: Nov. 23, 2000

(86) PCT No.: PCT/GB00/04464

§ 371 (c)(1),
(2), (4) Date: May 9, 2002

(87) PCT Pub. No.: WO01/39119

PCT Pub. Date: May 31, 2001

(30) Foreign Application Priority Data

Nov. 23, 1999  (GB) .................................. 9927678.4
Mar. 17, 2000  (GB) .................................. 0006534.2

(51) Int. Cl.
*G06K 1/00* (2006.01)
*G06K 15/00* (2006.01)
*H04N 1/387* (2006.01)
*G06T 17/00* (2006.01)
*G06T 15/20* (2006.01)

(52) U.S. Cl. .................... 358/1.18; 358/1.15; 358/450; 345/418; 345/419; 345/420; 345/427

(58) Field of Classification Search ................ 358/1.15, 358/1.16, 1.18, 450, 1.9, 501, 504; 382/285; 345/419, 581, 653, 664, 679, 418, 420, 427, 345/619; 715/517

See application file for complete search history.

(56) References Cited

U.S. PATENT DOCUMENTS 4,583,117 A     4/1986   Lipton et al. .................. 358/92

(Continued)

FOREIGN PATENT DOCUMENTS

EP           0 790 584 A      8/1997

(Continued)

OTHER PUBLICATIONS

Hartley, R.I., "*Euclidean Reconstruction from Uncalibrated Views*," G.E. CRD, Schenectady, N.Y. 12301, USA (the research described in this paper has been supported by DARPA Contract # MDA972-91-C-0053.

(Continued)

*Primary Examiner*—Edward L Coles
*Assistant Examiner*—Thomas J Lett
(74) *Attorney, Agent, or Firm*—Fitzpatrick, Cella, Harper & Scinto

(57) ABSTRACT

Customer computer processing apparatus (2, 4) are connected to a service apparatus (6) via the Internet (8). Service apparatus (6) processes requests and payment details from a customer apparatus (2, 4), and, in response to a valid payment, sends instructions to the customer apparatus to enable the customer apparatus to control a printer (18) or a display panel (19) to print or display a photographic mat (24). Service apparatus (6) retains details of the photographic mat pattern for subsequent use. Images of a subject object on the photographic mat are recorded at different positions and orientations with a camera (16). Data defining the images is returned from the customer processing apparatus (2, 4) to the service apparatus (6). The service apparatus processes the image data along with the stored pattern data to identify the photographic mat features in the images and to calculate the position and orientation at which each image was recorded. A three-dimensional computer model of the subject object is then generated using the calculated positions and orientations.

36 Claims, 6 Drawing Sheets

U.S. PATENT DOCUMENTS

| | | | | |
|---|---|---|---|---|
| 4,956,705 | A | 9/1990 | Wright | 358/88 |
| 5,231,292 | A | 7/1993 | Wittwer | 250/561 |
| 5,394,520 | A | 2/1995 | Hall | 395/135 |
| 5,815,683 | A | 9/1998 | Vogler | 395/500 |
| 5,960,125 | A | 9/1999 | Michael et al. | 382/294 |
| 6,463,351 | B1 * | 10/2002 | Clynch | 700/163 |
| 7,062,722 | B1 * | 6/2006 | Carlin et al. | 715/850 |

FOREIGN PATENT DOCUMENTS

| | | | |
|---|---|---|---|
| EP | 0 794 516 A | 9/1997 | |
| EP | 0 794 517 A | 9/1997 | |
| EP | 0 898 245 A1 | 2/1999 | |
| EP | 0 901 105 A1 | 3/1999 | |
| EP | 0 930 583 A | 7/1999 | |
| GB | 2 270 435 A | 3/1994 | |
| GB | 2 325 996 A | 12/1998 | |
| JP | 9-170914 | 6/1997 | |
| JP | 09-170914 A | 6/1997 | |
| JP | 11-96374 A | 4/1999 | |
| WO | WO 88/02518 | 4/1988 | |
| WO | WO 91/09273 | 6/1991 | |
| WO | WO 98/05157 | 2/1998 | |
| WO | WO 98/18117 | 4/1998 | 2 |

OTHER PUBLICATIONS

Niem, W., "*Automatic Reconstruction of 3D Objects Using A Mobile Camera*," Image and Vision Computing 17 (1999), pp. 125-134, Elsevier Science B.V., Hanover, Germany.

Gortler, S.J., et al., "*The Lumigraph*," Computer Graphics Proceedings, Annual conference Series (Apr. 8, 1996), XP-000682720.

Tsai, R.Y., "*A Versatile Camera Calibration Technique for High-Accuracy 3D Machine Vision Metrology Using Off-The-Shelf TV Cameras and Lenses*," IEEE Journal of Robotics and Automation, vol. RA-3, No. 4 (Aug. 1987), pp. 323-344.

Niem, W., et al., "*Automatic Reconstruction of 3D Objects Using a Mobile Monoscopic Camera*," Institut für Theoretische Nachrichtentechnik und Informationsverarbeitung, Hannover, IEEE 0-8186-7943-3/97 (1997), pp. 173-180.

Wiles, C., et al., *Calibrating A Multi-Camera System for 3D Modelling*, 1999 IEEE Workshop on Multi-View Modeling and Analysis of Visual Scenes (Jun. 26, 1999), ISBN 0-7695-0110-9.

Wheeler, M., et al., "*Consensus Surfaces for Modeling 3D Objects from Multiple Range Images*," Proceedings of ICCV 1998 (Jan. 1998).

Hartley, R., "*Euclidean Reconstruction from Uncalibrated Views*," Applications of Invariance in Computer Vision, Mundy, Zisserman and Forsyth eds, Azores (1993), pp. 237-256.

Szeliski, R., *Shape from Rotation*, Cambridge Research Laboratory Technical Report CRL 90/13 (Dec. 21, 1990).

Gortler, S., et al., "*The Lumigraph*," Computer Graphics Proceedings, Annual Conference Series (1996), ACM-0-89791-746-4/96/008, pp. 43-52.

\* cited by examiner

IMAGE PROCESSING APPARATUS

The present invention relates to the recording of images of an object and the processing of the image data to determine the position and orientation at which the images were recorded, and to generate data defining a three-dimensional (3D) computer model of the object.

3D computer models of objects are useful for many applications. In particular, there is now a growing demand from members of the public to have 3D computer models of objects for uses such as the embellishment of Internet sites, etc.

However, conventional products for generating 3D computer models of an object are both expensive and require considerable processing resources (that is, processing power and/or time). Consequently, this restricts the availability of 3D computer modelling packages to users.

The present invention has been made with this in mind.

According to the present invention, there is provided a system or method for generating three-dimensional computer models of objects using a technique in which an object is imaged at the same time as a calibration pattern, the images are processed to determine the positions and orientations at which they were recorded, and the images and positions and orientations are processed to generate a 3D computer model of the object. Data defining the calibration pattern is stored in a first computer processing apparatus, and data is sent to a customer computer processing apparatus to enable the customer apparatus to print or display the calibration pattern. Images of a subject object together with the calibration pattern are then recorded and returned to the first apparatus, which performs processing using the stored data defining the calibration pattern to determine the positions and orientations at which the images were recorded. Subsequently, a three-dimensional computer model of the subject object is generated using the calculated positions and orientations.

By storing data defining the calibration pattern in a first apparatus, transmitting calibration pattern data to the customer apparatus, and performing the imaging position and orientation calculations in the first apparatus, the user is not required to purchase expensive processing products, or to run a resource-intensive product on his apparatus. Instead, computationally expensive processing can be performed in a supplier's apparatus, and the user can pay a small fee each time the processing services offered by the supplier are used, this being enabled by the transmission of calibration pattern data to the user and the storage of data defining the calibration pattern which will appear in the return images.

The present invention also provides separate apparatus for making up the system above.

The present invention further provides computer program products for configuring programmable processing apparatus for use in the system above.

Embodiments of the invention will now be described, by way of example only, with reference to the accompanying drawings, in which:

FIG. 1 schematically shows the components of a first embodiment of the invention, together with the notional functional processing units into which the computer components may be thought of as being configured when programmed by programming instructions;

Figure 1:
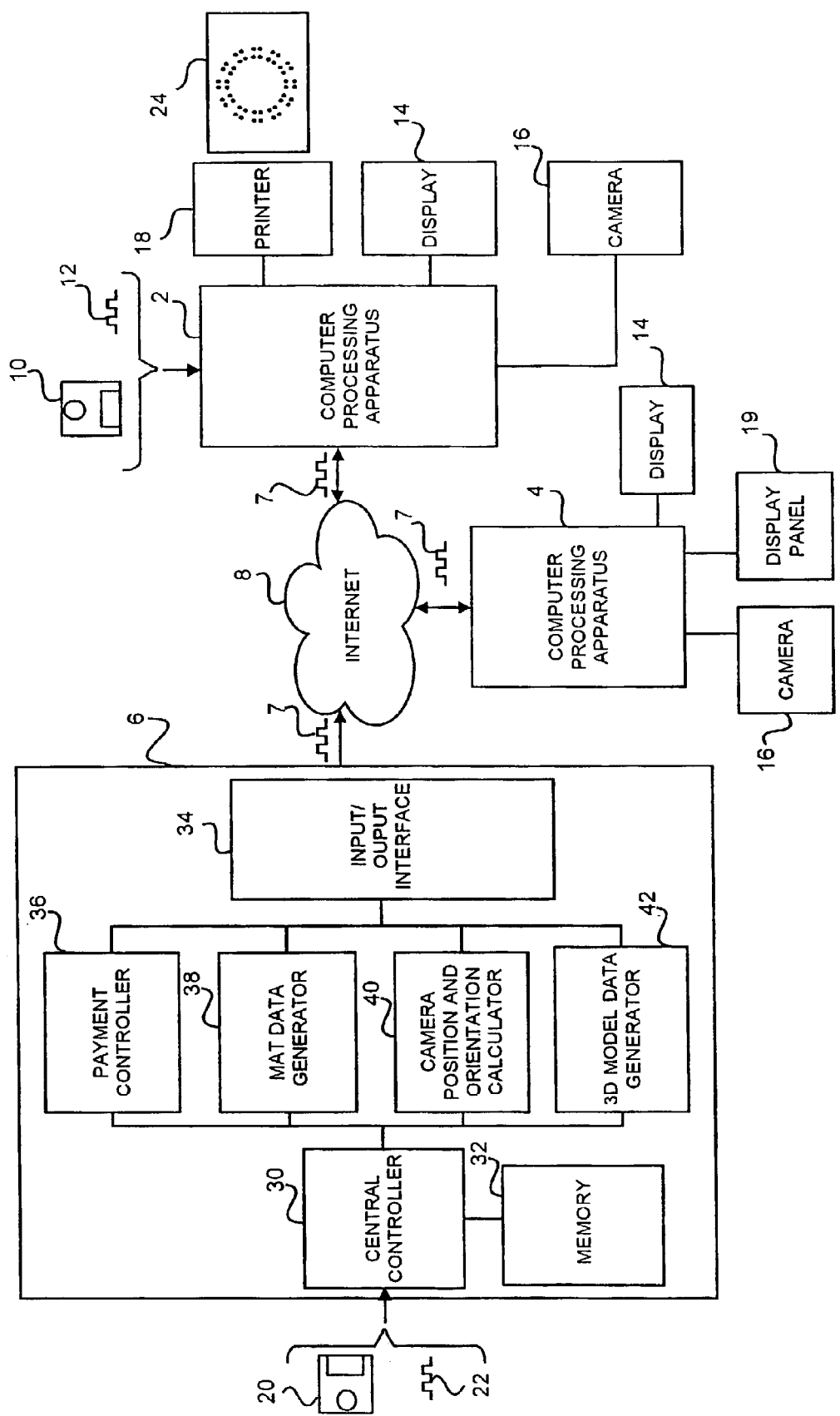

Referring to FIG. 1, a first embodiment of the invention comprises a plurality of computer processing apparatus 2, 4, 6 connected to exchange data by transmitting signals 7 via a communications network 8, such as the Internet.

In this embodiment each processing apparatus 2, 4 is used by a customer, and has connected thereto a display device 14, such as a conventional personal computer monitor and a digital camera 16. In addition, the processing apparatus 2 has connected thereto a printer 18, and processing apparatus 4 has connected thereto a flat display panel 19 having controllable pixels, such as the PL400 manufactured by WACOM.

Each of the processing apparatus 2, 4 is a conventional personal computer programmed to operate in accordance with programming instructions input, for example, as data stored on a data storage medium, such as disk 10, and/or as a signal 12 input to the processing apparatus 2, 4, for example from a remote database, by transmission over a communication network such as the Internet 8 or by transmission through the atmosphere and/or entered by a user via a user input device such as keyboard (not shown). The programming instructions for each processing apparatus 2, 4 may be supplied either in compiled, computer executable format or in a format (such as source code) for conversion to a compiled format.

Processing apparatus 6 is provided by a 3D modelling service provider. In this embodiment, processing apparatus 6 comprises a conventional programmable computer, containing in a conventional manner, one or more processors, memories, graphics cards, etc.

The processing apparatus 6 is programmed to operate in accordance with programming instructions input, for example, as data stored on a data storage medium, such as disk 20 and/or as a signal 22 input to the processing apparatus 6, for example from a remote database, by transmission over a communication network such as the Internet 8 or by transmission through the atmosphere and/or entered by a user via a user input device such as a keyboard (not shown). The programming instructions for processing apparatus 6 may be supplied either in compiled, computer executable format or in a format (such as source code) for conversion to a compiled format.

As will be described in more detail below, the programming instructions comprise instructions to cause the processing apparatus 6 to become configured to process payments from a user, and in response to a valid payment, to transmit instructions to a connected customer computer processing apparatus 4, 6 to enable the customer apparatus to control printer 18 to print a calibration pattern thereby to form a calibration object which, in this embodiment, comprises a photographic mat 24 having a special pattern of features thereon, or to control a display panel 19 to display the calibration pattern so that the display displaying the features of the calibration pattern acts as a photographic mat. The programming instructions further cause the processing apparatus 6 to become configured to process data received from a customer computer processing apparatus 2, 4 defining images of a subject object and the photographic mat so as to calculate the positions and orientations at which the images were recorded by detecting the positions of the features of the photographic mat pattern (calibration pattern) in the images, and to use the calculated positions and orientations to generate data defining a three-dimensional computer model of the subject object which is transmitted to the paying user. When programmed by the programming instructions, processing apparatus 6 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent units and connections into which the processor, memory etc of the processing apparatus 6 become configured.

Referring to the functional units shown in FIG. 1 a central controller 30 provides control and processing for the other functional units, and a memory 32 is provided for use by central controller 30 and the other functional units.

An input/output interface 34 is arranged for the output of signals 7 to, and receipt of signals 7 from, the connected customer computer processing apparatus 2, 4.

A payment controller 36 is arranged to perform processing operations to obtain and check payments from a customer computer processing apparatus 2, 4.

A mat data generator 38 generates control signals which are sent as signals 7 to customer processing apparatus 2 to enable customer apparatus 2 to control printer 18 to print a calibration pattern on a recording medium such as a piece of paper to form a photographic mat 24, or to customer processing apparatus 4 to enable customer apparatus 4 to control display panel 19 to display the calibration pattern to form the photographic mat. As will be described in more detail below, the photographic mat comprises a pattern of features (calibration pattern), and the subject object(s) for which a three-dimensional computer model is to be generated is placed on the printed photographic mat 34 or on the display panel 19 on which the photographic mat is displayed. Images of the subject object on the photographic mat are then recorded by a camera 16 and returned to the processing apparatus 6 as signals 7 for processing. Mat data generator 38 stores in memory 32 data defining the calibration pattern printed or displayed to form the photographic mat for use by the processing apparatus 6 in calculating the positions and orientations at which the received images were recorded.

Camera position and orientation calculator 40 processes the received data defining a plurality of images of the subject object(s) and the printed or displayed photographic mat to calculate the position and orientation of the camera 16 when each image was recorded.

3D model data generator 42 processes the received data defining the images and the data defining the positions and orientations at which the images were recorded to generate data defining a 3D computer model of the object(s) in the images.

Figure 2:
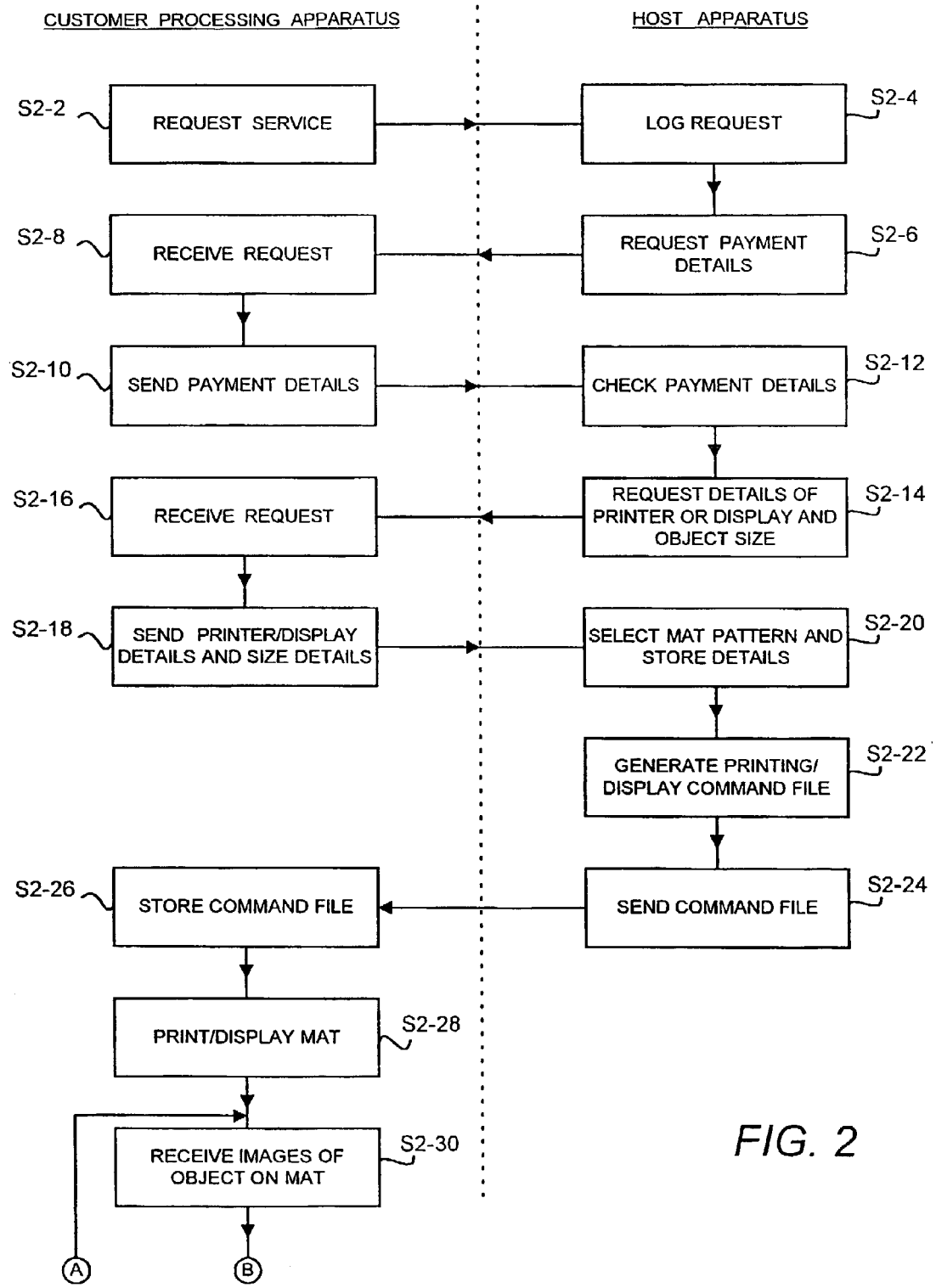
FIG. 2 shows the processing operations performed by the apparatus in the system of FIG. 1 to generate data defining a 3D computer model of an object.
Figure 2:
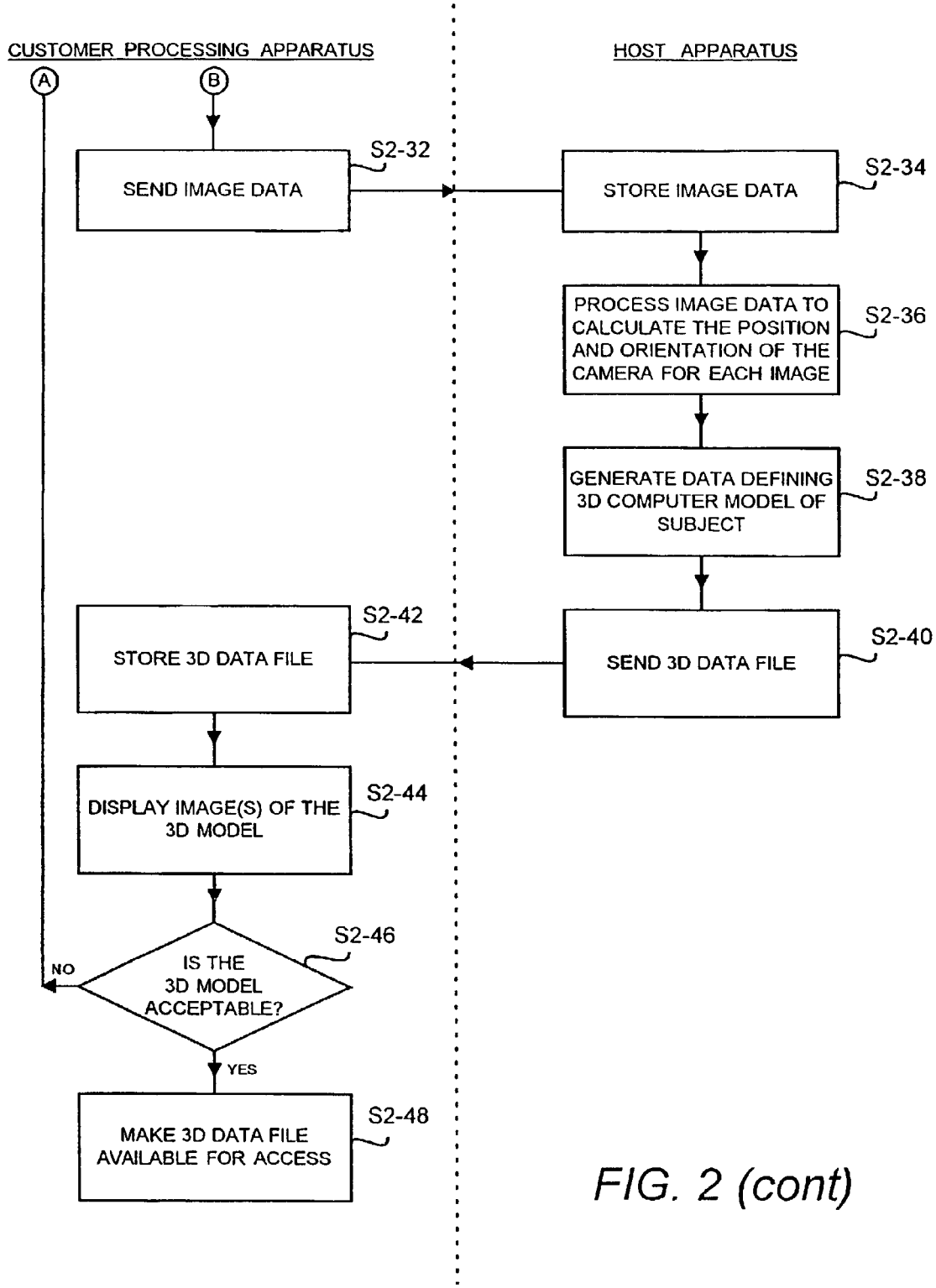

FIG. 2 shows the processing operations performed by processing apparatus 6 and one of the customer computer processing apparatus 2, 4 in the first embodiment. Communication between the processing apparatus 6 and the customer computer processing apparatus is by the transmission of signals 7 over the communication network 8.

Referring to FIG. 2, at step S2-2, a customer processing apparatus 2, 4 transmits a request to processing apparatus 6 for a 3D modelling service.

At step S2-4, payment controller 36 of processing apparatus 6 logs the request, and at step S2-6 transmits a signal to the customer processing apparatus requesting payment details, for example a credit card number or identification of an account which the customer holds with the operator of processing apparatus 6.

At step S2-8, the customer processing apparatus receives the payment request, and at step S2-10 sends the requested payment details.

At step S2-12, payment controller 36 in processing apparatus 6 receives the payment details sent by the customer processing apparatus and checks the details, for example to confirm the credit card payment with an authorization agency or to check whether the customer's account is in credit.

It is determined at S2-12 that a satisfactory payment has been made, then, at step S2-14, mat data generator 38 requests data from the customer processing apparatus defining the type of printer 18 or display panel 19 which is to print or display the photographic mat, and also data defining the maximum width in any direction of the object to be placed on the photographic mat.

At step S2-16, the customer processing apparatus receives the request for printer/display details and object size, and at step S2-18, sends the requested details to the processing apparatus 6.

At step S2-20, mat data generator 38 selects at random a calibration pattern for the photographic mat from patterns prestored in memory 32, and stores data in memory 32 defining which pattern has been selected.

More particularly, in this embodiment, calibration patterns comprising concentric circles connected by radial line segments with known dimensions and position markers in each quadrant, for example as described in "Automatic Reconstruction of 3D Objects Using a Mobile Camera" by Niem in Image and Vision Computing 17 (1999) pages 125-134, patterns comprising concentric rings with different diameters, for example as described "The Lumigraph" by Gortler et al in Computer Graphics Proceedings, Annual Conference Series, 1996 ACM-0-89791-764-4/96/008, patterns comprising coloured dots with each dot having a different hue/brightness combination so that each respective dot is unique, for example as described in JP-A-9-170914, and patterns comprising spatial clusters of features for example as described in the assignee's PCT application filed concurrently herewith which claims priority from UK patent applications 9927678.4 and 0012812.4 and has attorney reference CFP1662WO 2714299 (the full contents of which are incorporated herein by cross-reference) are stored in memory 32.

In this embodiment, the features on the photographic mat are arranged around a blank central area on which the subject object is to be placed. Mat data generator 38 selects the diameter of the central blank area to be larger than the maximum width of the object defined in the data received from the customer processing apparatus. In this way, the features in the calibration pattern on the photographic mat are positioned so that they will be visible when the object is placed on the mat.

At step S2-22, mat data generator 38 generates a command file for use by the customer processing apparatus to cause printer 18 to print a photographic mat having the calibration pattern selected at Step S2-20, or for use by processing apparatus 4 to cause display panel 19 to display a photographic mat with the calibration pattern selected at step S2-20. More particularly, in this embodiment, mat data generator 38 generates the command file in dependence upon the type of printer or display defined in the details received from the customer apparatus, so that the instructions in the command file are suitable for enabling the customer apparatus to control the printer or display panel connected to the customer processing apparatus.

At step S2-24, the command file generated at step S2-22 is sent from processing apparatus 6 to the customer processing apparatus.

At step 2-26, the customer processing apparatus stores the received command file sent from the processing apparatus 6, and at step S2-28, the customer processing apparatus uses the command file to print the calibration pattern using printer 18 to form a photographic mat 24 or to display the calibration pattern to form a photographic mat on display panel 19.

Having printed or displayed the photographic mat, the subject object (or objects) for which a 3D computer model is to be generated, is placed in the blank centre portion of the photographic mat, so that the object is surrounded by the calibration pattern features on the mat.

Images of the object and the photographic mat are then recorded at different positions and orientations using a camera 16 to show different parts of the subject object. More particularly, in this embodiment, camera 16 remains in a fixed position (for example a tripod) and the photographic mat with a subject object thereon is moved (translated) and rotated, and photographs of the subject object at different positions and orientations relative to the camera 16 are recorded. During the rotation and translation of the photographic mat, the subject object does not move relative to the mat.

At step S2-30, the customer processing apparatus receives data defining the recorded images showing the subject object(s) on the photographic mat, and at step S2-32, sends the image data to the processing apparatus 6.

In FIG. 2, steps S2-26 to S2-32 described above are shown as occurring without interruption. However, after receiving and storing the command file step at S2-26, connection between the customer processing apparatus and the processing apparatus 6 may be broken while the user of the customer processing apparatus performs step S2-28, records images of the subject object and calibration pattern, and inputs the image data to the customer processing apparatus. The steps of printing or displaying the calibration pattern, recording the images of the subject object and calibration pattern, and inputting the image data to the customer processing apparatus need not occur immediately after receiving and storing the command file at step S2-26. For example, these steps may be performed one or more days later. Similarly, images of the subject objection and calibration pattern may be taken one or more days after printing or displaying the calibration pattern in step S2-28. Consequently, when step S2-32 is performed to send image data from the customer processing apparatus to the processing apparatus 6, it may be necessary to re-establish a connection from the customer processing apparatus to the processing apparatus 6 via the network 8.

At step S2-34, processing apparatus 6 stores the image data received from the customer processing apparatus in memory 32, and at step S2-36, processes the image data to calculate the position and orientation of the camera 16 for each image.

More particularly, at step S2-36, camera position and orientation calculation 40 performs processing first to calculate the values of the intrinsic parameters of the camera 16 which recorded the images (that is, the aspect ratio, focal length, principal point, first order radial distortion coefficient and skew angle) in a conventional manner, for example as described in "Euclidean Reconstruction from Uncalibrated Views" by Hartley in Applications of Invariance in computer Vision, Mundy Zisserman and Forsyth Eds at pages 237-256, Azores, 1993. Camera position and orientation calculator 40 then performs processing for each respective image to detect the features of the calibration pattern on the photographic mat in the image, to label the features (that is, to identify a one-to-one correspondence between each feature detected in the image and a feature of the calibration pattern defined in the data previously stored in memory 32 at step S2-20), and to use the one-to-one correspondences to calculate the position and orientation at which the image was recorded. More particularly, in this embodiment, the processing to detect and label the features and to calculate the camera position and orientation is performed as described in "Automatic Reconstruction of 3D Objects Using a Mobile Camera" by Niem in Image and Vision Computing 17 (1999) pages 125-134, "The Lumigraph" by Gortler et al in Computer Graphics Proceedings, Annual Conference Series, 1996 ACM-0-89791-764-4/96/008, JP-A-9-170914 or the assignee's PCT application filed concurrently herewith which claims priority from UK Patent applications 9927678.4 and 0012812.4 and has attorney reference CFP1662WO 2714299, depending upon the mat pattern selected at step S2-20.

At step S2-38, 3D model data generator 42 in processing apparatus 6 performs processing using the image data previously stored at step 2-34 and the position and orientation of each image calculated at step S2-36 to generate data defining a computer model of the 3D surface of the subject object and to generate texture data for the surface model. This processing is performed using one of the techniques described in "Automatic Reconstruction of 3D Objects Using a Mobile Camera" by Niem in Image and Vision Computing 17 (1999) pages 125-134, "The Lumigraph" by Gortler et al in Computer Graphics Proceedings, Annual Conference Series, 1996 ACM-0-89791-764-4/96/008, JP-A-9-170914 or the assignee's PCT application filed concurrently herewith which claims priority from UK Patent applications 9927678.4 and 0012812.4 and has attorney reference CFP1662WO 2714299.

At step S2-40, 3D model data generator 42 transmits a signal 7 to the customer processing apparatus containing data defining the 3D computer model generated at step S2-38.

At step S2-42, the 3D data file sent by processing apparatus 6 is stored in the customer processing apparatus, and at step S2-44, one or more images of the 3D computer model are rendered from user-selected viewing directions and are displayed to the user on display device 14.

At step S2-46, the customer processing apparatus reads input signals from a user defining whether the 3D computer model is of an acceptable standard.

If it is determined at step S2-46 that the 3D computer model is acceptable, then, at step s2-48, the 3D data file previously stored at S2-42 is made available for access via other apparatus by the Internet 8, in a conventional manner.

On the other hand, if it is determined at step S2-46 that the 3D computer model is not acceptable, then steps S2-30 to S2-46 are repeated. That is, further images of the subject object on the photographic mat are recorded and sent to processing apparatus 6, processing apparatus 6 performs processing using the further images to amend and improve the 3D computer model, and the improved model is transmitted to the customer processing apparatus. Steps S2-30 to S2-46 are repeated until a satisfactory 3D computer model has been generated.

Figure 3:
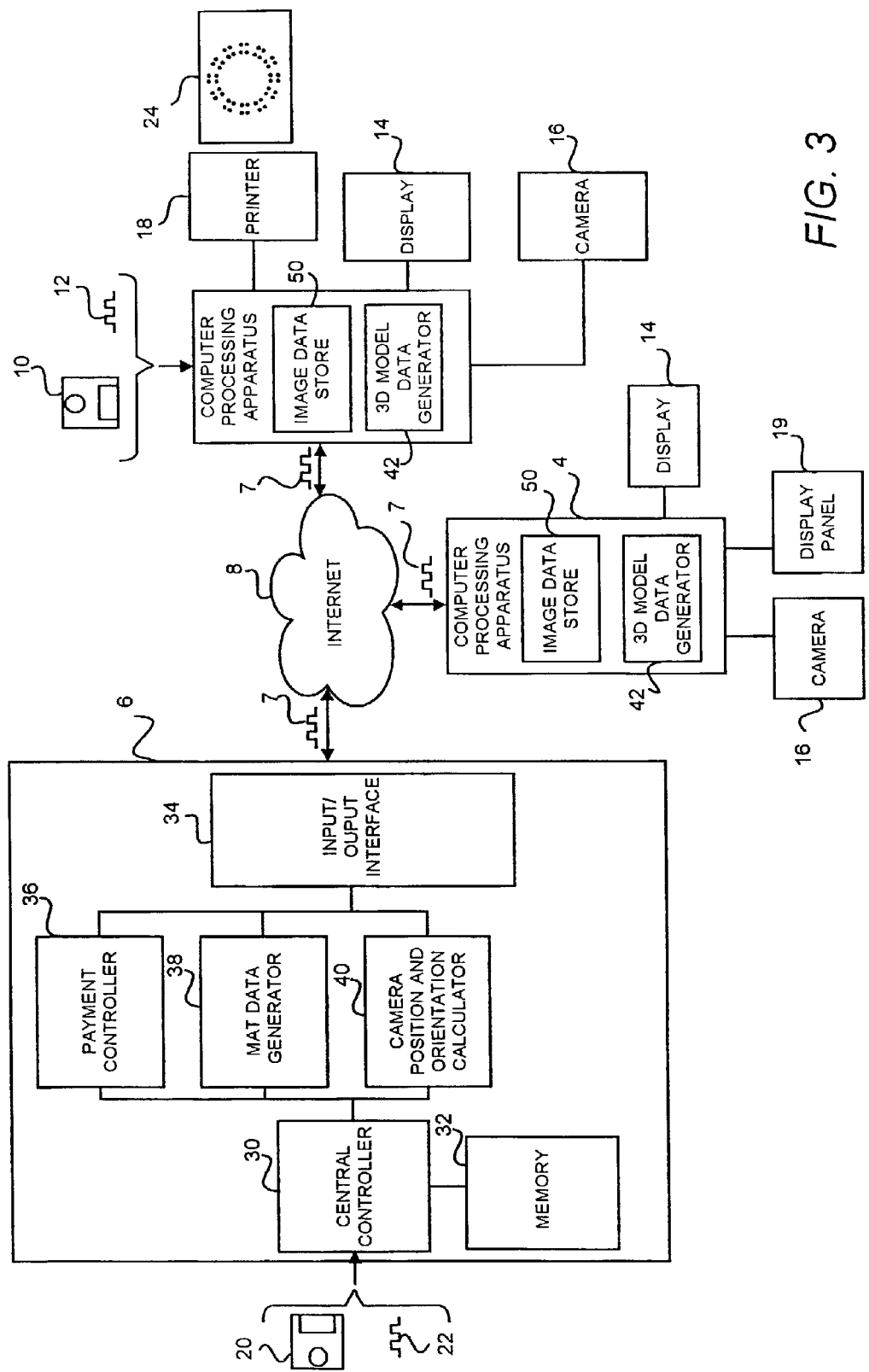
FIG. 3 shows the components of a second embodiment of the invention, together with the notional functional processing units into which the computer components may be thought of as being configured when programmed by programming instructions.

FIG. 3 shows the components of a second embodiment.

In the second embodiment, components which are the same as the first embodiment are labelled with the same reference number, and will not be described again here as they have already been described above.

The differences between the components in the second embodiment compared to the components in the first embodiment are, firstly, an image data store 50 is provided in each customer computer processing apparatus 2, 4, and, secondly, the 3D model data generator 42 which was provided in processing apparatus 6 in the first embodiment is now provided in each customer computer processing apparatus 2, 4. All of the other components are the same.

Figure 4:
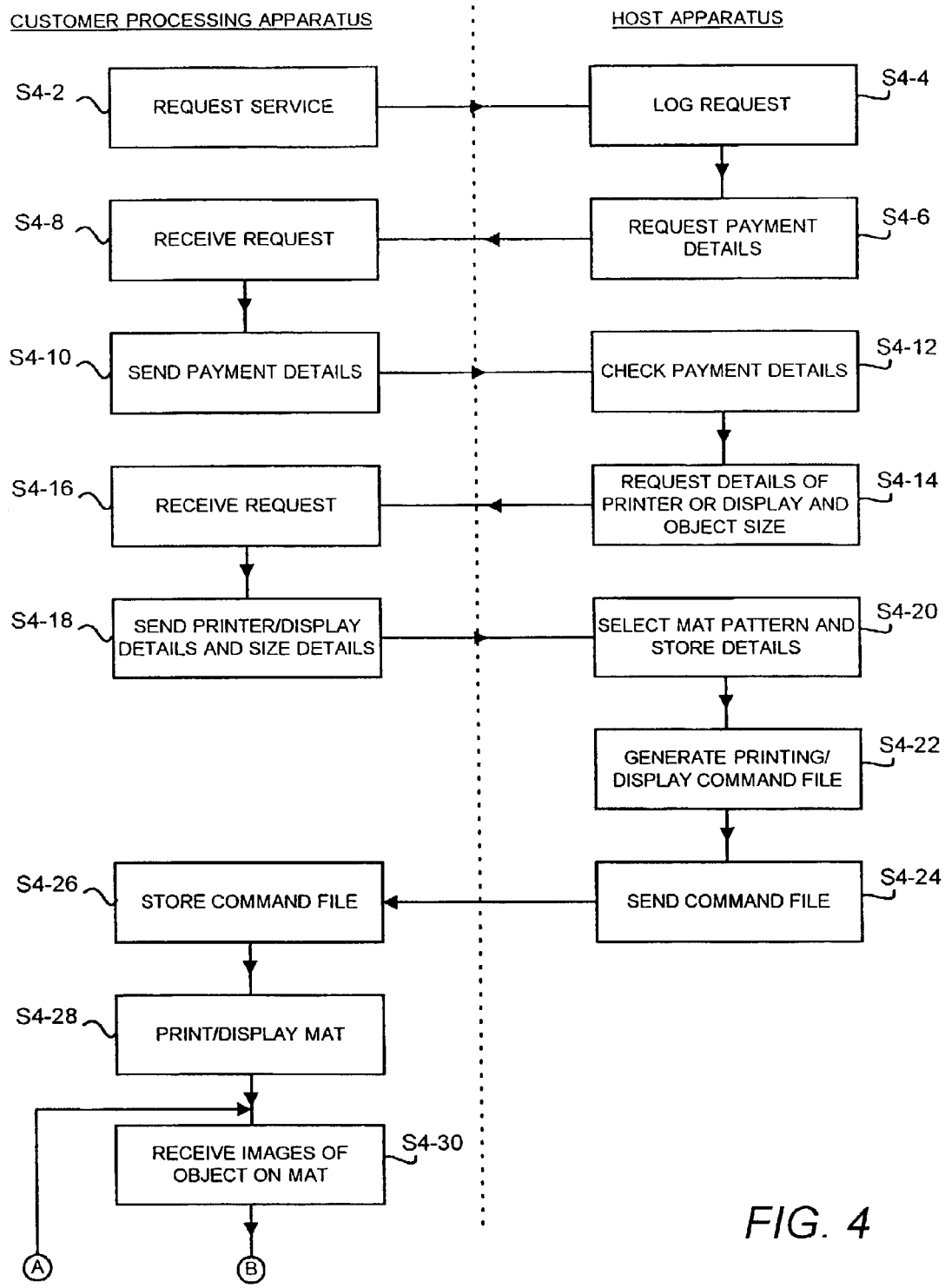
FIG. 4 shows the processing operations performed by the apparatus in the system of FIG. 3 to generate data defining a 3D computer model of an object.
Figure 4:
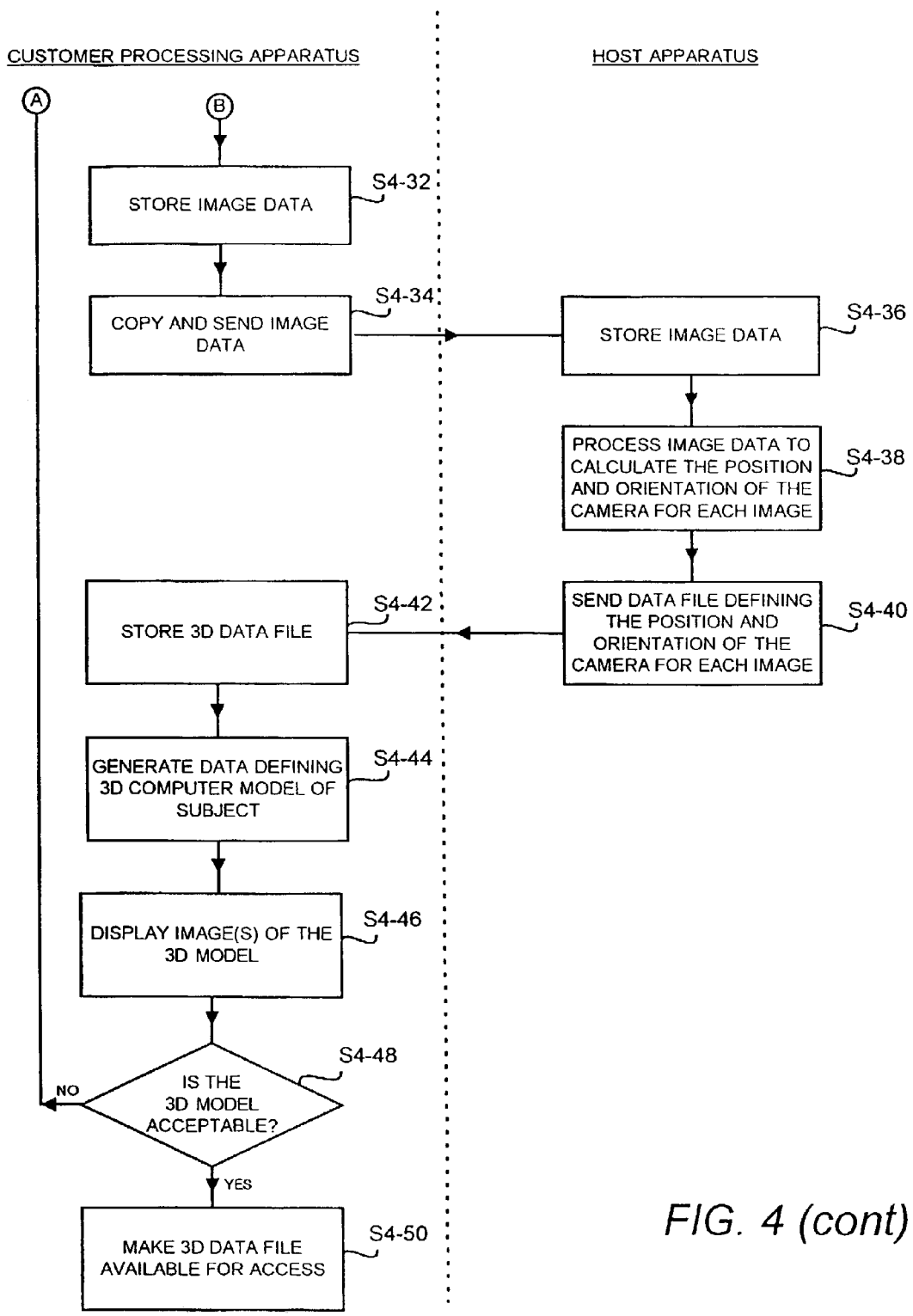

FIG. 4 shows the processing operations in the second embodiment.

Referring to FIG. 4, steps S4-2 to S4-30 are the same as steps S2-2 to S2-30 in the first embodiment, and accordingly will not be described again here.

In the first embodiment, data defining images of the subject object and photographic mat is transmitted from a customer processing apparatus 2, 4 to processing apparatus 6, where it is processed to calculate the position and orientation of each image and to generate data defining a 3D computer model of the subject object. A 3D data file defining the 3D computer model is then returned from processing apparatus 6 to the customer processing apparatus.

In the second embodiment, however, processing to calculate the position and orientation at which each image is recorded is still carried out in processing apparatus 6, but processing to generate data defining a 3D computer model of the subject object is performed in a customer processing apparatus 2, 4.

More particularly, referring to FIG. 4, at step S4-32, images of the subject object and the photographic mat are stored in the customer computer processing apparatus in image data store 50.

At step S4-34, the image data stored at step S4-32 is copied and sent from the customer computer processing apparatus to the processing apparatus 6.

At step S4-36, processing apparatus 6 stores the received image data in memory 32, and at step S4-38, camera position and orientation calculator 40 performs processing to calculate the position and orientation of the camera 16 for each image. Step S4-38 is the same as step S2-36 in the first embodiment, and accordingly will not be described again here.

At step S4-40, processing apparatus 6 transmits a data file defining the positions and orientations of the images calculated at step S4-38 to the customer processing apparatus.

At step S4-42, the customer computer processing apparatus stores the data file defining the positions and orientations, and at step S4-44, performs processing using the image data previously stored at step S4-32 and the positions and orientations stored at S4-42 to generate data defining a 3D computer model of the subject object. Step S4-44 is performed in the same way as step S2-38, and accordingly will not be described again here.

Steps S4-46 to S4-50 are the same as steps S2-44 to S2-48 in the first embodiment, and accordingly will not be described again here.

Many modifications can be made to the embodiments above within the scope of the present invention.

For example, the subject object does not need to be placed on the photographic mat. More particularly, the subject object may be placed alongside the mat and images recorded so that at least part of the object and calibration pattern are visible in each image.

Accordingly, the photographic mat does not need to be in a horizontal plane. It could, for example, be hung in a vertical plane behind the subject object.

In the embodiments described above, the printer instructions sent from processing apparatus 6 to a customer computer processing apparatus instruct printer 18 to print photographic mat 24 in accordance with the object size. If the size is so large that a photographic mat 24 cannot be printed on a single sheet of paper, then mat data generator 38 may generate data to control printer 18 to print different parts of the calibration pattern of the photographic mat 24 on separate sheets of paper, which can then be placed together to form the photographic mat 34.

Alternatively, mat data generator 38 may generate data to control printer 18 to print different parts of the calibration pattern on separate sheets and, instead of assembling the separate sheets to form a photographic mat 24 so that the features in the calibration pattern are at known predetermined positions stored in processing apparatus 6, the separate sheets with the different parts of the calibration pattern thereon may be placed around the subject object at positions and orientations chosen by the user, so that the positions of the calibration pattern parts relative to each other are not known.

Images of the subject object and the different parts of the calibration pattern on the separate sheets would then be recorded at different positions and/or orientations by moving the imaging camera 16 relative to the subject object and the sheets.

In each input image, the features in each part of the calibration pattern are known (because mat data generator 38 sent data defining the features to be printed) but the relative positions of the different parts of the calibration pattern around the subject object are not known. Accordingly, camera position and orientation calculator 40 performs processing to detect the features of the calibration pattern in each image by searching each image to detect the predetermined features of the calibration pattern which are stored in memory 32, and then uses the detected features to calculate the positions and orientations of the images relative to each other.

More particularly, because camera position and orientation calculator 40 detects predetermined calibration pattern features in the input images, as described in the embodiments above, camera position and orientation calculator 40 establishes a one-to-one-correspondence between features in each input image and stored calibration pattern features. These one-to-one correspondences therefore define features in different input images which correspond to each other, that is, features which match between the different input image. This is because, features in different input images which correspond to the same stored calibration pattern therefore correspond to (match) each other.

Camera position and orientation calculator 40 therefore performs processing to calculate the relative positions and orientations of the camera 16 for each input image using the matching features in the input images.

Many techniques are known for calculating relative imaging positions and orientations once matching features and input images have been detected. For example, suitable processing is described in EP-A-0898245 and EP-A-0901105.

In summary, therefore, in this modification, the photographic mat comprises a plurality of pieces, each piece having part of the calibration pattern thereon. When images of the subject object and the photographic mat are processed, the features of the calibration pattern are known and prestored in processing apparatus 6 and can therefore be reliably detected by camera position and orientation calculator 40 in each input image. The input images are then processed by camera position and orientation calculator 40 to calculate the imaging positions and orientations relative to each other using the detected features to define matching features in the input images, and using the matching features to calculate the relative positions and orientations in a conventional manner.

Further, in the embodiments above, the calibration pattern may be attached to the subject object, and the camera moved relative to the subject object with the calibration pattern thereon to record the images at different positions and/or orientations. For example, one or more calibration patterns may be attached to different surfaces of the subject object.

In the embodiments above, processing apparatus 6 may generate the instructions for enabling the customer processing apparatus to print or display a calibration pattern to form a photographic mat in dependence upon data received from the customer processing apparatus defining characteristics other than the size of the subject object. For example, processing apparatus 6 may generate the instructions in dependence upon the colour of the subject object so that the features in the calibration pattern on the photographic mat do not have the same colour as the subject object and can therefore easily be distinguished from features on the subject object.

The display panel 19 could comprise any form of display apparatus for displaying the calibration pattern of the photographic mat. For example, the display panel 19 could comprise the display of display device 14 which could be turned so that the display is horizontal if the object is to be placed on the photographic mat, or could be placed behind the object so that the display is in a substantially vertical plane.

In the embodiments described above, the calibration object which is imaged with the subject object has the form of a two-dimensional photographic mat. However, instead of a photographic mat, a three-dimensional calibration object may be used. For example, mat data generator 38 may generate instructions to control printer 18 to print calibration patterns of features on separate sheets, and the sheets may then be folded into or attached to a three-dimensional object, such as a cube. The cube with the calibration pattern on it can then be used as a three-dimensional calibration object.

In the embodiments above, at step S2-20 and step S4-20, mat data generator 38 selects a calibration pattern from the patterns stored in memory 32 at random. However, calibration patterns may be selected in other ways. For example, the identity of the customer may be determined and a calibration pattern previously allocated to the customer selected. Further, mat data generator 38 may select a calibration pattern in dependence upon characteristics of the printer/display defined in the details received from the customer processing apparatus. For example, mat data generator 38 may select a calibration pattern in dependence upon whether the printer is a colour printer and the resolution of the printer. In this way, a calibration pattern with appropriate features for the printer can be selected.

In addition, processing apparatus 6 may store details of each customer's printer/display so that, when a customer requests a service, the identity of the customer may be determined and the printer/display details read, so that it is not necessary for the customer to send the printer/display details.

In the embodiments described above, at steps S2-22 and S4-22, mat data generator 38 generates a command file to be used by the customer processing apparatus to control printer 18 or display panel 19. However, instead of generating and sending a printer or display command file, mat data generator may send data defining the calibration pattern selected at step S2-20 and S4-20. The customer processing apparatus would then generate its own instructions to control printer 18 or display 19 to print is or display the calibration pattern.

In the embodiments above, processing is performed by camera position and orientation calculator 40 to calculate the intrinsic parameters of the camera 16 which was used to record images of the photographic matter and subject object. However, instead, the intrinsic parameters may be transmitted from the customer computer processing apparatus to processing apparatus 6 or, default values may be assumed for some, or all, of the intrinsic camera parameters.

In the embodiment above, each camera 16 is a digital camera connected to a customer processing apparatus. However, each camera 16 may be separate from a customer processing apparatus and may transfer data thereto via a memory device or a temporary connection etc. Further, images of the photographic mat and subject object may be recorded using a conventional film camera and a scanner connected to the customer computer processing apparatus may be used to scan photographs to generate digital image data for transmission to processing apparatus 6.

In the embodiments above, the 3D computer model generated by 3D model data generator 42 may be made available for access on the Internet 8 by processing apparatus 6 rather than a customer computer processing apparatus 2, 4.

In the embodiments above, if it is determined at step S2-46 (FIG. 2) or step S4-48 (FIG. 4) that a 3D model is not of an acceptable standard, then the model is improved by recording and processing further images. However, in addition, or instead, the model may be amended interactively by a user by displaying the model and moving, adding or deleting points or surfaces making up the model.

In the embodiments above, the customer computer processing apparatus 2, 4 to which photographic mat print or display instructions are sent by processing apparatus 6 is also the customer processing apparatus to which image data is input (step S2-30 or step S4-30) and which sends the image data to the processing apparatus 6 (step S2-32 or step S4-34). However, different customer computer processing apparatus may be used to print or display the photographic mat and to receive input image data and send the image data to the processing apparatus 6. For example, processing apparatus 6 may send print instructions to processing apparatus 2, which uses the instructions to control printer 18 to print a photographic mat 24. Photographic mat 24 and a subject object may then be imaged using a camera 16 and the image data input to a different customer processing apparatus 4, which transmits the image data to processing apparatus 6.

In the first embodiment above, the processing apparatus 6 sends the data file defining the 3D computer model generated by the 3D model data generator 42 back to the customer computer processing apparatus which sent the image data to the computer processing apparatus 6 for processing. However, instead, data defining the 3D computer model may be sent to a different customer computer processing apparatus. For example, processing apparatus 6 may send print instructions to customer processing apparatus 2 which uses the instructions to control printer 18 to print a photographic mat 24. Customer computer processing apparatus 2 may also then return image data to the processing apparatus 6 for processing. However, instead of returning data defining the resulting 3D computer model to processing apparatus 2, processing apparatus 6 may send the data defining the 3D computer model to a different processing apparatus 4.

In the second embodiment described above, at step S4-32, the customer computer processing apparatus stores image data for subsequent use when data has been received from processing apparatus 6 defining the positions and orientations of the images to generate the 3D computer model data. Instead, however, to remove the need for the customer processing apparatus to store the image data, processing apparatus 6 may return the image data together with the data defining the position and orientation of each image to the customer processing apparatus.

In the second embodiment described above, the data defining the position and orientation of each image is returned to the customer computer processing apparatus which sent the image data to the processing apparatus 6 for processing. However, the data defining the position and orientation results may be sent to a different customer computer processing apparatus together with the image data. For example, processing apparatus 6 may send print instructions to processing apparatus 2, which uses the instructions to control printer 18 to print a photographic mat 24 and processing apparatus 2 may return image data to processing apparatus 6. Processing apparatus 6 may then calculate the position and orientation of each image, and send the calculated positions and orientations together with the received image data to customer computer processing apparatus 4. Customer computer processing apparatus 4 may then process the received data to generate a 3D computer model of the subject object.

In the embodiments described above, two customer processing apparatus 2, 4 are described as connected to processing apparatus 6. However, more, or less, customer processing apparatus may of course be connected to processing apparatus 6.

In the embodiments described above, the functional processing units of processing apparatus 6 are described as part of a single apparatus. However, the functional components may be provided in a number of separate apparatus which act together to constitute processing apparatus 6.

In the embodiments above, the communications network 8 connecting the computer processing apparatus 2, 4, 6 comprises a single network. However, the network may comprise a plurality of connected networks. One or more of the computer processing apparatus 2, 4, 6 may be connected to the network(s) via a wireless connection (for example radio signals). Of course, one or more connections between the computer processing apparatus 2, 4, 6 may be a telephone connection.

In the embodiments described above, at steps S2-38 and S4-44 processing is performed to generate data defining a 3D computer model of the subject object, at steps S2-44 and S4-46, images of the 3D computer model are displayed, and at steps S2-48 and S4-50, the data defining the 3D computer model is made available for access. However, in addition, or instead, the imaging positions and orientations calculated at steps S2-36 and S4-38 may be used to control manufacturing equipment to manufacture a physical model of the subject object. For example, data may be generated to control a cutting apparatus to cut material to the appropriate dimensions to model the subject object.

In the embodiments described above, processing is performed by computers using processing routines defined by programming instructions. However, some, or all, of the processing could be performed using hardware.

The invention claimed is:

1. A method of processing image data, comprising the steps of:
    storing calibration pattern data in a first apparatus;
    sending the calibration pattern data from the first apparatus to a second apparatus to allow generation of a calibration pattern image in the second apparatus;
    generating the calibration pattern image in the second apparatus using an image printer apparatus according to the calibration pattern data;
    combining a plurality of images of a subject object and the calibration pattern image by an image recording device at different relative orientations;
    recording combined image data defining the combined images;
    sending the combined image data to the first apparatus; and
    performing processing in the first apparatus on the basis of the stored calibration pattern data and the sent combined image data to calculate the orientations at which at least some of the images were recorded.

2. A method according to claim 1, further comprising the step of performing processing in the first apparatus using the calculated orientations to generate data defining a three-dimensional computer model of the subject object.

3. A method according to claim 1, further comprising the steps of:
    sending data defining the calculated orientations from the first apparatus to a 3D modelling apparatus; and
    performing processing in the 3D modelling apparatus using the calculated orientations to generate data defining a three-dimensional computer model of the subject object.

4. A method according to claim 1, further comprising the step of performing processing using the calculated orientations to generate data for controlling an apparatus to create a physical model of the subject object.

5. A method according to claim 1, further comprising the step of sending data defining details of the image output apparatus from the second apparatus to the first apparatus, and wherein the calibration pattern data is generated by the first apparatus in dependence upon the details of the image output apparatus.

6. A method according to claim 1, further comprising the step of sending data defining a characteristic of the subject object from the second apparatus to the first apparatus, and wherein the calibration pattern data is generated by the first apparatus in dependence upon the characteristic of the subject object.

7. A method according to claim 1, wherein the image output apparatus comprises a printer, and wherein the generation of the calibration pattern image using the calibration pattern data from the first apparatus comprises printing the calibration pattern image using the printer.

8. A method according to claim 1, wherein the image output apparatus comprises a display, and wherein the generation of the calibration pattern image using the calibration pattern data from the first apparatus comprises displaying the calibration pattern image on the display.

9. A method according to claim 1, wherein the first apparatus and the second apparatus are connected with each other via the Internet.

10. A method according to claim 2 or claim 3, further comprising the step of using the data defining the three-dimensional computer model to control an apparatus to create a physical model of the subject object.

11. A method according to claim 3, wherein the 3D modelling apparatus is the second apparatus to which the calibration pattern data is sent by the first apparatus.

12. A method according to claim 7, wherein the calibration pattern data is sent from the first apparatus to the second apparatus for enabling the second apparatus to control a printing apparatus to print the calibration pattern image as a plurality of respective parts to be printed on separate recording media.

13. A method of processing image data in a first processing apparatus, the method comprising the steps of:
    storing calibration pattern data defining a calibration pattern image in the first processing apparatus;
    sending the calibration pattern data from the first processing apparatus to a second processing apparatus, thereby to enable the second processing apparatus to generate the calibration pattern image using an image printing apparatus;
    combining a plurality of images of a subject object and the calibration pattern image by an image recording device at different relative orientations;
    receiving combined image data defining the combined images; and performing processing on the basis of the stored calibration pattern data and the received combined image data to calculate the orientations at which at least some of the images were recorded.

14. A method according to claim 13, further comprising the step of performing processing using the calculated orientations to generate data defining a three-dimensional computer model of the subject object.

15. A method according to claim 13, further comprising a step of sending data defining the calculated orientations to a 3D modelling apparatus to enable the 3D modelling apparatus to perform processing using the calculated orientations to generate data defining a three-dimensional computer model of the subject object.

16. A method according to claim 13, further comprising a step of performing processing using the calculated orientations to generate data for controlling an apparatus to create a physical model of the subject object.

17. A method according to claim 13, wherein the combined image data is received from the second processing apparatus.

18. A method according to claim 13, wherein the combined image data is received from a third processing apparatus.

19. A method according to claim 13, wherein data defining details of the image output apparatus is received from the second processing apparatus, and the data defining the calibration pattern data sent to the second processing apparatus is generated in dependence upon the details of the image output apparatus.

20. A method according to claim 13, wherein data defining a characteristic of the subject object is received from the second processing apparatus, and wherein the calibration pattern data sent to the second processing apparatus is generated in dependence upon the characteristic of the subject object.

21. A method according to claim 13, wherein the image output apparatus comprises a printer and wherein the calibration pattern data sent to the second processing apparatus comprises data to enable the second processing apparatus to print the calibration pattern image using the printer.

22. A method according to claim 13, wherein the image output apparatus comprises a display and wherein the calibration pattern data sent to the second processing apparatus comprises data to enable the second processing apparatus to display the calibration pattern image on the display.

23. A method according to claim 13, wherein the calibration pattern data is received from and sent via the Internet.

24. A method according to claim 14, further comprising a step of using the data defining the three-dimensional computer model to generate data for controlling an apparatus to create a physical model of the subject object.

25. A method according to claim 14, further comprising a step of using the data defining the three-dimensional computer model to generate a physical model of the subject object.

26. A method according to claim 15, wherein the 3D modelling apparatus is the second processing apparatus to which the calibration pattern data is sent.

27. A method according to claim 15, wherein image data for images for which the orientation of the image recording device has been calculated is sent to the 3D modelling apparatus together with the data defining the calculated orientations.

28. A method according to claim 21, wherein the calibration pattern data sent to the second processing apparatus defining the calibration pattern image defines the calibration pattern image as a plurality of respective parts to be printed on separate recording media.

29. An apparatus for processing image data comprising:
a calibration pattern data generator operable to generate calibration pattern data defining a calibration pattern image;
a data store configured to store the calibration pattern data for subsequent use;
a sender to send to a second processing apparatus the calibration pattern data defining the calibration pattern image to enable the second processing apparatus to generate the calibration pattern image using an image printing apparatus;
a combiner to combine a plurality of images of a subject object and the calibration pattern image by an image recording device at different relative orientations;
an image data receiver operable to receive data corresponding to the combined images in the second processing apparatus; and
an orientation calculator operable to perform processing the received images on the basis of the stored calibration pattern data to calculate the orientation at which at least some of the images were recorded.

30. Apparatus according to claim 29, further comprising:
a computer model generator operable to perform processing using the calculated orientations to generate data defining a three-dimensional computer model of the subject object.

31. Apparatus according to claim 29, further comprising:
an orientation data transmitter operable to send data defining the calculated orientations to a 3D modelling apparatus to enable the 3D modelling apparatus to perform processing using the calculated orientations to generate data defining a three-dimensional computer model of the subject object.

32. Apparatus according to claim 29, wherein the calibration pattern data generator is arranged to generate the calibration pattern data in dependence upon details of the image output apparatus received from the second processing apparatus.

33. Apparatus according to claim 29, wherein the calibration pattern data generator is arranged to generate the calibration pattern data in dependence upon data defining a characteristic of the subject object received from the second processing apparatus.

34. Apparatus according to claim 29, wherein the calibration pattern data generator is operable to generate the calibration pattern data to enable the second processing apparatus to print the calibration pattern image with a printer.

35. Apparatus according to claim 29, wherein the calibration pattern data generator is operable to generate the calibration pattern data to enable the second processing apparatus to display the calibration pattern image on a display.

36. Apparatus according to claim 34, wherein the calibration pattern data generator is arranged to generate the calibration pattern data to define the calibration pattern image as a plurality of respective parts to be printed on separate recording media.

* * * * *